(12) United States Patent
Steffen

(10) Patent No.: US 7,101,525 B2
(45) Date of Patent: Sep. 5, 2006

(54) CATALYTIC DEVICE FOR THE IMPLEMENTATION OF A REACTION IN A GASEOUS MEDIUM AT HIGH TEMPERATURE

(75) Inventor: Joseph Steffen, Kembs (FR)

(73) Assignee: Butachimie, Boulogne Billancourt (FR)

( * ) Notice: Subject to any disclaimer, the term of this patent is extended or adjusted under 35 U.S.C. 154(b) by 248 days.

(21) Appl. No.: 10/343,276

(22) PCT Filed: Jul. 27, 2001

(86) PCT No.: PCT/IB01/01692

§ 371 (c)(1),
(2), (4) Date: May 9, 2003

(87) PCT Pub. No.: WO02/10067

PCT Pub. Date: Feb. 7, 2002

(65) Prior Publication Data

US 2003/0175195 A1    Sep. 18, 2003

(30) Foreign Application Priority Data

Jul. 28, 2000    (FR) ................................. 00 09937

(51) Int. Cl.
*C01C 3/02* (2006.01)
*B01J 35/02* (2006.01)
*B01J 32/00* (2006.01)
*C01B 21/26* (2006.01)

(52) U.S. Cl. ...................... 423/372; 422/211; 423/376; 423/403; 423/659; 502/439; 502/527.24

(58) Field of Classification Search ................ 423/376, 423/403, 372, 659; 422/211; 502/527.24, 502/439
See application file for complete search history.

(56) References Cited

U.S. PATENT DOCUMENTS 1,934,838 A    11/1933    Andrussow (Continued)

FOREIGN PATENT DOCUMENTS

DE            3923094    *  1/1991    .................. 502/439

(Continued)

OTHER PUBLICATIONS

US 5,096,687, 03/1992, Agrawal (withdrawn)

*Primary Examiner*—Wayne A. Langel
(74) *Attorney, Agent, or Firm*—Blakely Sokoloff Taylor & Zafman

(57) ABSTRACT

The present invention relates to a catalytic device for the implementation of a reaction in a gaseous medium at high temperature, such as, for example, the synthesis of HCN or the oxidation of ammonia, comprising: at least one textured material (1) which is effective as catalyst for the said reaction, a support (2) comprising at least one ceramic part (3), the structure of which makes possible the passage of the gases, the said part (3) of the said support (2) having a corrugated face (6), so that the increase in surface area (β) produced by the corrugations with respect to a flat surface is at least equal to that (α) calculated for sawtooth corrugations and of between approximately 1.1 and approximately 3, the said textured material (1) being positioned so that it is held against the corrugated face (6) of the said part (3) of the said support (2) and follows the form thereof.

15 Claims, 1 Drawing Sheet

U.S. PATENT DOCUMENTS

| | | | |
|---|---|---|---|
| 4,189,405 A * | 2/1980 | Knapton et al. | 502/73 |
| 4,289,657 A * | 9/1981 | Nelson | 502/314 |
| 4,397,772 A * | 8/1983 | Noakes et al. | 422/177 |
| 4,412,859 A | 11/1983 | Hatfield | |
| 4,731,229 A * | 3/1988 | Sperandio | 422/188 |
| 4,985,230 A * | 1/1991 | Baden et al. | 423/650 |
| 5,051,294 A * | 9/1991 | Lunkas et al. | 428/184 |
| 5,122,185 A | 6/1992 | Hochella et al. | |
| 5,160,722 A | 11/1992 | Hochella et al. | |
| 5,215,724 A | 6/1993 | Haerle | |
| 5,262,145 A | 11/1993 | Agrawal et al. | |
| 5,278,124 A | 1/1994 | Hochella et al. | |
| 5,356,603 A | 10/1994 | Hochella et al. | |
| 5,401,483 A | 3/1995 | Ostroff | |
| 5,527,756 A | 6/1996 | Ostroff | |
| 5,699,680 A | 12/1997 | Guerlet et al. | |
| 6,003,591 A | 12/1999 | Campbell | |
| 6,030,594 A * | 2/2000 | Ward | 423/403 |
| 6,071,850 A * | 6/2000 | Friedman et al. | 502/439 |
| 6,099,809 A * | 8/2000 | Foster et al. | 422/180 |
| 2002/0081243 A1* | 6/2002 | He | 422/177 |

FOREIGN PATENT DOCUMENTS

| | | |
|---|---|---|
| EP | 0275681 | 7/1988 |
| EP | 0428265 | 5/1991 |
| EP | 0931585 | 7/1999 |
| FR | 2694306 | 7/1992 |

\* cited by examiner

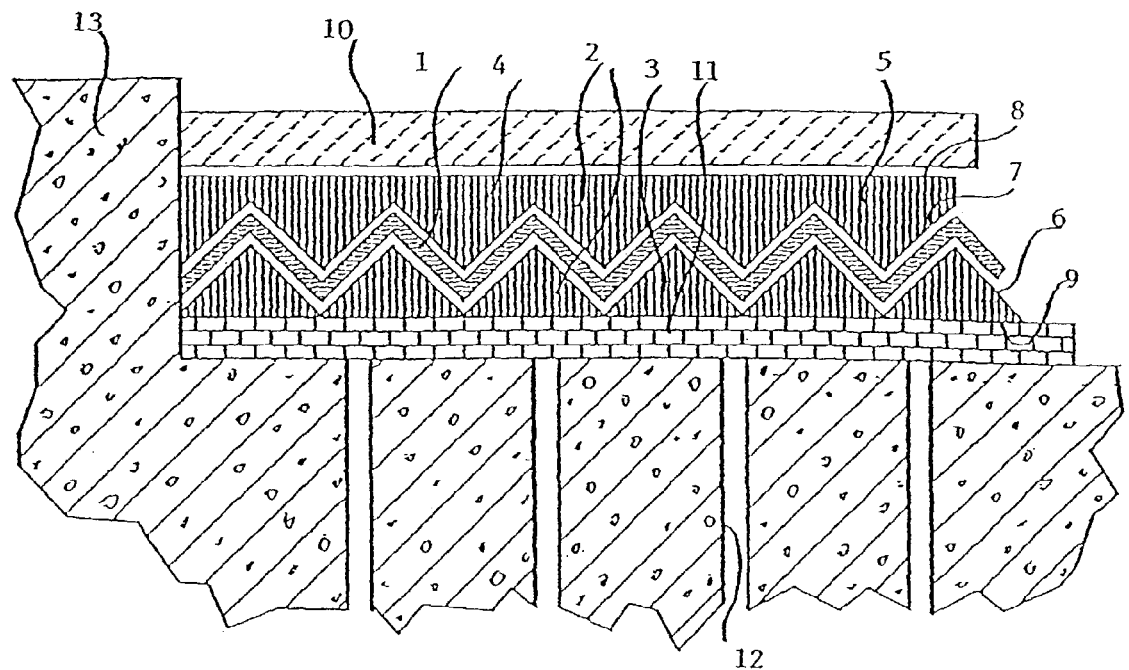
FIG_1
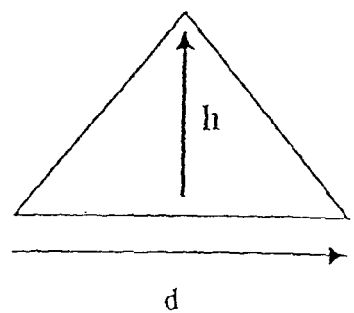
FIG_2

CATALYTIC DEVICE FOR THE IMPLEMENTATION OF A REACTION IN A GASEOUS MEDIUM AT HIGH TEMPERATURE

The present patent application is a non-provisional application of International Application No. PCT/IB01/01692, filed Jul. 27, 2001.

The present invention relates to catalytic reactions in a gaseous medium at high temperature, for example the oxidation of ammonia and the synthesis of HCN. A particular subject-matter of the invention is an improved catalytic device which can be used in this type of reaction and a reactor comprising it.

The oxidation of ammonia is widely used in the production of nitric acid. The process, known as the Ostwald process, comprises the stage of passing a preheated ammonia/air mixture, typically comprising 5–15%, in particular 10–12% of air by volume, with a high linear velocity (measured under standard temperature and pressure conditions) through a catalytic device extending over the transverse cross-section of the reactor.

The synthesis in a single operation of hydrocyanic acid (HCN) from ammonia and a gaseous hydrocarbon, in which synthesis the heat needed for the endothermic reaction is provided by simultaneous combustion reactions with oxygen or a gas comprising oxygen, such as air, in the presence of a catalyst, is an operation which has been known for a great many years (U.S. Pat. No. 1,934,838). It is known as the Andrussow process.

These two types of reaction use catalysts from the platinum group, generally in the form of a flat woven gauze. The apparent working cross-section of these catalysts is limited by the dimensions of the reactor.

In order to increase the productivity of these reactors, it is possible to increase the number of catalytic gauzes. However, beyond a certain thickness, the pressure drop thus created opposes the increase in the flow of reactant and nullifies the effects of a better conversion yield. In addition, the increase in thickness can promote side reactions. Thus, the difficulties in increasing production in the current state of the art are due:

to the pressure drops,
to the number of active sites of the catalyst (contact surface area),
to the contact time of the catalyst with the reactants.

With the aim of increasing the effective surface area of the catalyst, U.S. Pat. Nos. 5,160,722 and 5,356,603 provide for the use of catalyst gauzes having transverse corrugations. Although this surface area is thus increased, these corrugations have low amplitudes. Furthermore, the shape-retention of this assembly is only really possible for temperatures of less than 800° C. Beyond this, the mechanical characteristics of the metal become insufficient and, from the increase in the pressure drop, the folds or corrugations have a tendency to sag. The lifetime of such a device is thus very short and thus incompatible with industrial operation.

Patent Application EP 931,585 for its part discloses the use of a catalyst gauze in the form of radially corrugated discs or cones, so that a revolving burner can follow the corrugations as it rotates about its axis. However, the above-mentioned problems remain.

An aim of the present invention is therefore to provide a catalytic device comprising a catalyst which has a greater geometric surface area and which withstands the reaction conditions without substantially increasing the pressure drop or the side reactions.

The present invention relates to a catalytic device for the implementation of a reaction in a gaseous medium at high temperature, such as, for example, the synthesis of HCN or the oxidation of ammonia, comprising:

at least one textured material which is effective as catalyst for the said reaction, a support comprising at least one ceramic part, the structure of which makes possible the passage of the gases, the said part of the said support having a corrugated face, so that the increase in surface area ($\beta$) produced by the corrugations with respect to a flat surface is at least equal to that ($\alpha$) calculated for sawtooth corrugations and of between approximately 1.1 and approximately 3, the said textured material being positioned so that it is held against the corrugated face of the said part of the said support and follows the form thereof.

The means which makes it possible to hold the textured material against the corrugated face of the part of the support is advantageously composed of a second part of the ceramic support, the structure of which makes possible the passage of the gases, the said second part having a corrugated face which is substantially homologous and complementary with the said corrugated face of the said first part of the support and the said second part being positioned so that the said corrugated faces of the said first and second parts are facing and that the textured material is inserted between the said corrugated faces and follows the form thereof. Thus, the pressure drop is advantageously substantially homogeneous over the whole of the catalytic device thus formed.

Other conventional means known to a person skilled in the art can be used to hold the textured material against the corrugated face of the first part of the support.

The term "textured material" is understood to mean, within the sense of the present invention, any assemblage of strips or wires which are linear and/or in the form of helical components which makes possible the passage of the gases. This assemblage is, for example, of the gauze, woven fabric, knitted fabric or felt type and can be obtained by various techniques, such as weaving, knitting, sewing, embroidery, and the like. It is advantageously a gauze.

The term "two corrugated faces of substantially homologous and complementary form" is understood to mean, within the sense of the present invention, any combination of two faces exhibiting corrugations with a similar size and form, that is to say having a substantially identical increase in surface area $\beta$, which is constructed such that, when these two faces are facing, the corrugations are complementary.

Other subject-matters and advantages of the invention will become apparent to persons skilled in the art from the detailed description hereinbelow and by means of references to the following illustrative drawings.

FIG. 1 represents a specific diagrammatic example of a catalytic device according to the invention.

FIG. 2 represents the parameters which make it possible to calculate the increase in surface area ($\alpha$) produced by sawtooth corrugations.

The support (2) according to the invention is made of ceramic, the structure of which makes possible the passage of the gases. Examples of these ceramics are, without limitation, ceramic foams or ceramic composites. The support (2) can have a honeycomb structure. The term "ceramic" is advantageously understood to mean, within the sense of the present invention, any refractory material capable of withstanding the temperature to which a catalytic platinum gauze is brought in the reaction medium comprising, inter alia, steam. In the case of the application in the synthesis of HCN according to the Andrussow process, this temperature can reach 1200° C. The materials which are suitable are therefore then based on alumina and can comprise variable proportions of silica (10 to 60% by weight) and of magnesium, zirconium, titanium and cerium oxide (1 to 20% by weight for each of these constituents). These materials can comprise, without limitation, one or more of the following compounds: silicon dioxide (silica $SiO_2$), silicon carbide SiC, silicon nitride $Si_3N_4$, silicon boride, silicon boronitride, aluminium oxide (alumina $Al_2O_3$), aluminosilicate ($3Al_2O_3$—$2SiO_2$), aluminoborosilicate, carbon fibres, zirconium oxide ($ZrO_2$), yttrium oxide ($Y_2O_3$), calcium oxide (CaO), magnesium oxide (MgO) and cordierite (MgO—$Al_2O_3$—$SiO_2$).

Use will advantageously be made of the ceramic Stetta®G29 from Stettner, the characteristics of which are as follows:

| Porosity in % | Relative Density in kg/dm³ | Flexural strength N/mm² | Linear coefficient of expansion 1/K · 10⁻⁶ at 20– | Linear coefficient of expansion | Thermal conductivity W/(mK) | Thermal shock resistance in ° C. | Maximum operating temperature in ° C. | Volume resistance at 800° C. |
|---|---|---|---|---|---|---|---|---|
| >3 | 2 | 45 | 1.5–3 | 2–4 | 1.3–1.7 | 380 | 1000 | 10⁵ |

Prior to their use, these materials which are used to form the support (2) are generally formed according to known techniques of moulding, extrusion, agglomeration, and the like. They are subsequently calcined at high temperature (>1300° C.), so as to acquire mechanical properties compatible with their future operating conditions. These combined operations must confer on them a structure which makes possible the passage of the gases which can, for example, exist in the form of cells communicating in the 3 directions (foams) or of honeycombs with a circular or polygonal (square, rectangular, hexagonal, and the like) cross-section.

The textured material (1) which is effective as catalyst is in particular a catalytic metal from the platinum group and can be prepared from platinum, rhodium, iridium, palladium, osmium, ruthenium or the mixture or alloy of two or more of these metals. It is advantageously platinum or a platinum/rhodium alloy. Alternatively, this catalyst can be a mixture composed of a catalyst from the platinum group as described hereinabove and at least one other material including but not limited to cerium, cobalt, manganese, magnesium and ceramics.

The corrugations of the faces (6) and (7) of the support can be of any type, in particular sawtooth corrugations.

The sawtooth corrugations will be defined by the height "h" of each corrugation and the distance "d" between 2 corrugations. The increase in surface area α produced by corrugations of this type can thus be calculated from these 2 parameters (FIG. 2) in the following way:

$$\alpha = \sqrt{(4h^2 + d^2)}/d$$

The increase in surface area (β) produced by any type of corrugation according to the invention will be at least equal to (α) and will be chosen within the range from approximately 1.1 to approximately 3. This is because α=1.1 corresponds to an increase in surface area of 10%. Below this value, the advantages of this corrugation are not very apparent. Above β=3, the use of such a device becomes difficult. The sawtooth corrugations according to the invention advantageously have a profile of an isosceles triangle with d=2h, which results in a ratio α of approximately 1.40 and thus in an increase in surface area of approximately 40%.

The present invention also relates to a reactor for an exothermic reaction at high temperature in a gaseous medium having a generally circular transverse cross-section, characterized in that it comprises the catalytic device according to the invention extending across its transverse cross-section.

It also relates to a reaction process in a gaseous medium at high temperature, such as the oxidation of ammonia or the synthesis of HCN, characterized in that it uses a catalytic device or a reactor according to the invention.

In a specific embodiment of the invention, the process according to the invention is the synthesis of HCN and comprises the stage of passing a gas mixture comprising a hydrocarbon, advantageously methane, ammonia and oxygen over the catalytic device according to the invention at a temperature of between 800 and 1400° C., so as to obtain, after reaction, a gas flow comprising at least 5% by volume of HCN.

The hydrocarbon used in the process for the synthesis of HCN according to the invention can be a substituted or unsubstituted and aliphatic, cyclic or aromatic hydrocarbon or a mixture thereof. The examples of these hydrocarbons include, without limitation, methane, ethylene, ethane, propylene, propane, butane, methanol and toluene. The hydrocarbon is advantageously methane.

The present invention also relates to a process for the preparation of the catalytic device according to the invention, characterized in that the textured material (1) is rolled out against the corrugated face (6) of the part (3) of the support (2), so that it follows the form thereof, and in that it is held there with the help of an immobilization means.

This immobilization means is advantageously mechanical and is composed of the second part (4) of the support (2), the corrugated face (7) of which covers the opposite face of the said material (1) to that situated against the corrugated face (6) of the part (3) of the said support (2).

More advantageously still, the combination thus formed generates a low pressure drop which is substantially homogeneous in the cross-section of the reactor.

A specific diagrammatic example of the device according to the invention (FIG. 1) is composed of:

a combination of corrugated gauzes (1), a corrugated ceramic support (2) in two parts (3) and (4), each having a corrugated face (6) and (7).

The gauzes (1) are situated between the two faces (6) and (7) of the parts (3) and (4) of the support (2).

The parts (3) and (4) of the support (2) are made of ceramic having a honeycomb structure with a circular or polygonal (square, rectangular, hexagonal, and the like) cross-section.

Example of the Preparation of the Catalytic Device According to the Invention:

The support (2) according to the invention can be given a corrugated form either before calcination (during the moulding stage) or after calcination, by assembling and adhering together prisms with a triangular cross-section.

A combination of platinum gauzes (1), constituting the catalytic charge, is subsequently inserted between 2 layers (3) and (4) of corrugated support (2). This positioning operation is carried out by rolling out, over the corrugated part (3) of the support (2), a combination of gauzes of elliptical form (1) which will be applied to the corrugations of the part (3) of the support, the support having been positioned beforehand on the hollow bricks (11) constituting the base of the reactor with a circular cross-section. The width of the elliptical gauzes corresponds to the internal diameter of the reactor. The length is equal to the width multiplied by the coefficient β defined previously. The upper layer (4) of corrugated material makes it possible to immobilize the gauzes (1) mechanically while conferring a homogeneous pressure drop on the combination over the entire exposed surface. A heat shield (10) is subsequently deposited on the catalytic device thus formed. It makes it possible to confine the reaction and all the activation energy to the nearest point of the surface of the gauzes (1). The hollow bricks (11) are themselves positioned on the boiler tubes (12) of the reactor, which are composed of a refractory cement (13).

Performance

The use of the catalytic device according to the invention makes it possible, for the same reactor, to increase the surface area for contact between the catalyst and the reactants. This results, for the same overall throughput of reactants, in an improved productivity and a minimal and substantially constant pressure drop, making possible production campaigns of longer duration, all the more so since such a device withstands the reaction conditions, in particular is not subjected to mechanical deformation.

The table hereinbelow makes it possible to compare the performance of a representative system of the prior art with a catalytic device according to the invention.

|  | PRIOR ART: Flat system | INVENTION: Corrugated system |
| --- | --- | --- |
| Coefficient α | 1.0 | 1.4 |
| Productivity: kg of HCN per tonne of air and kg of catalyst | 2.00 | 2.16 |
| Increase in pressure drop: % per month of the initial pressure drop | 29 | 5 |
| Duration of the test: hours of production | 993 | 3138 |

The invention claimed is:

1. Catalytic device for the implementation of a reaction in a gaseous medium at high temperature, comprising:
at least one textured material (1) which is effective as a catalyst for said reaction,
one support comprising one ceramic structure (3), which makes possible the passage of gases, said structure (3) having a corrugated face (6), so that the increase in surface area (β) produced by the corrugations with respect to a flat surface is between about 1.1 and 3, and at least equal to the increase of surface area (α) calculated for saw tooth corrugations according to a formula $\alpha=\sqrt{(4h^2+d^2)}/d$ in which h represents the height of each corrugation and d the distance between two corrugations,
said textured material (1) being positioned so that it is held against the corrugated face (6) of said structure (3) and follows the form thereof.

2. Catalytic device according to claim 1, wherein the means which makes it possible to hold the material (1) against the corrugated face (6) of the structure (3) is composed of a second ceramic structure (4) which makes possible the passage of gases, said structure (4) having a corrugated face (7) which is substantially homologous and complementary with said corrugated face (6) of said structure (3) and said structure (4) being positioned so that said corrugated faces (6) and (7) are facing and that the material (1) is inserted between said faces (6) and (7) and follows the form thereof, the pressure drop thus being advantageously substantially homogeneous over the whole of the catalytic device thus formed.

3. Catalytic device according to claim 1 or claim 2, wherein structure (3) and structure (4) have a honeycomb structure.

4. Catalytic device according to claim 1, wherein the corrugations are sawtooth corrugations, so that the increase in surface area $\beta=\sqrt{(4h^2+d^2)}/d$ in which h represents the height of each corrugation and d the distance between two corregations.

5. Catalytic device according to claim 4, wherein the increase in surface area β is about 1.4.

6. Catalytic device according to claim 1, wherein the textured material (1) is a gauze.

7. Reactor for an exothermic reaction at high temperature in a gaseous medium having a generally circular transverse cross-section, characterized in that it comprises a catalytic device as defined in claim 1 extending across its transverse cross-section.

8. Reactor according to claim 7, characterized in that the exothermic reaction is the synthesis of HCN.

9. Reactor according to claim 8, characterized in that the device is placed on the hollow bricks (11) constituting the base of the reactor and is covered with a heat shield.

10. The catalytic device according to claim 1 wherein the structure is suitable for the passage of gases suitable for the synthesis of HCN or the oxidation of ammonia.

11. A reaction process comprising:
preparing a gaseous mixture; and
passing the gaseous mixture over a catalytic device according to claim 1 or in a reactor according to claim 7.

12. The process according to claim 11, wherein the gaseous mixture comprises organic compounds suitable for the synthesis of HCN.

13. The process according to claim 12, wherein the gaseous mixture comprises a hydrocarbon, ammonia and oxygen and is passed over the catalytic device according to claim 1 at a temperature of between 800 and 1400° C., so as to obtain, after reaction, a gas flow comprising at least 5% by volume of HCN.

14. A process for the preparation of a catalytic device according to claim 1 wherein the textured material (1) is positioned against the corrugated face (6) by rolling the textured material (1) out against the surface (6) of the structure (3), so that it follows the form thereof.

15. The process according to claim 14, wherein an immobilization means (4) is positioned against the textured material (1) such that a surface (7) of the immobilization means (4) covers an opposite surface of the textured material (1) to that situated against the surface (6) of the structure (3).

* * * * *